(12) United States Patent
Logan et al.

(10) Patent No.: US 7,058,376 B2
(45) Date of Patent: Jun. 6, 2006

(54) RADIO RECEIVING, RECORDING AND PLAYBACK SYSTEM

(76) Inventors: James D. Logan, 23 Currier Rd., Candia, NH (US) 03034; Daniel M. Morton, 39 Magnus Ave., #2, Somerville, MA (US) 02143

(\*) Notice: Subject to any disclaimer, the term of this patent is extended or adjusted under 35 U.S.C. 154(b) by 556 days.

(21) Appl. No.: 10/331,198

(22) Filed: Dec. 30, 2002

(65) Prior Publication Data

US 2003/0163823 A1 Aug. 28, 2003

Related U.S. Application Data

(63) Continuation-in-part of application No. 10/165,587, filed on Jun. 8, 2002, which is a continuation-in-part of application No. 10/060,001, filed on Jan. 29, 2002, which is a continuation-in-part of application No. 09/782,546, filed on Feb. 13, 2001, now abandoned, which is a continuation-in-part of application No. 09/699,176, filed on Oct. 28, 2000, now abandoned, which is a continuation-in-part of application No. 09/536,969, filed on Mar. 28, 2000, which is a continuation-in-part of application No. 09/238,948, filed on Jan. 27, 1999.

(60) Provisional application No. 60/346,418, filed on Dec. 29, 2001.

(51) Int. Cl.
*H04B 1/00* (2006.01)

(52) U.S. Cl. .................................. 455/186.1; 455/132

(58) Field of Classification Search ....... 455/3.01–3.06, 455/132, 142, 186.1, 318, 179.1, 185.1; 725/89, 725/102, 92
See application file for complete search history.

(56) References Cited

U.S. PATENT DOCUMENTS

| | | | | |
|---|---|---|---|---|
| 4,750,213 A | * | 6/1988 | Novak | 455/3.01 |
| 5,732,324 A | * | 3/1998 | Rieger, III | 455/3.01 |
| 6,233,389 B1 | * | 5/2001 | Barton et al. | 386/46 |

\* cited by examiner

*Primary Examiner*—Nick Corsaro
(74) *Attorney, Agent, or Firm*—Charles G. Call

(57) ABSTRACT

A radio receiver and storage unit which concurrently and continuously receives and records a plurality of separate, simultaneously broadcast programs, and then selectively reproduces desired programs at desired times. User interface buttons selectively perform the following five functions not available on a conventional radio: Pause: suspends the reproduction of the live or recorded programming currently being played; Save: permits the listener to save the complete content of a live program currently being reproduced; Jukebox: permits the listener can select and playback previously recorded programming; Mark: allows the user to "bookmark" a specific position on a program; and Options: permits the user to obtain information about available programming, or to perform less frequently used functions.

16 Claims, 2 Drawing Sheets

RADIO RECEIVING, RECORDING AND PLAYBACK SYSTEM

CROSS REFERENCE TO RELATED APPLICATIONS

This is a continuation in part of, and claims the benefit of the effective filing date of, each of the following pending United States patent applications, the disclosures of which are hereby incorporated herein by reference: U.S. application Ser. No. 09/238,948 filed on Jan. 27, 1999 by James D. Logan entitled "Apparatus and Methods for Broadcast Monitoring and for Providing Individual Programming;" U.S. application Ser. No. 09/536,969 filed on Mar. 28, 2000 by James D. Logan et al. entitled "Systems and Methods for Modifying Broadcast Programming;" U.S. application Ser. No. 09/699,176 filed on Oct. 28, 2000 abandoned by James D. Logan et al. entitled "Advertising Supported Music Delivery System;" U.S. application Ser. No. 09/782,546 filed on Feb. 13, 2001 abandoned by James D. Logan et al. entitled "Broadcast Program and Advertising Distribution System;" U.S. application Ser. No. 10/060,001 filed on Jan. 29, 2002 now published as Pub. No. 2002-020925 A entitled "Audio and Video Program Recording, Editing and Playback Systems Using Metadata;" and U.S. application Ser. No. 10/165,587 filed on Jun. 8, 2002 by James D. Logan et al. entitled "Audio and Video Program Recording, Editing and Playback Systems Using Metadata."

This application further claims the benefit of the filing date of U.S. Provisional Patent Application Ser. No. 60/346,418 filed on Dec. 29, 2001 by James D. Logan et al. entitled "Radio Receiving, Recording and Playback System."

FIELD OF THE INVENTION

This invention relates to methods and apparatus for receiving, recording and reproducing radio and television signals and more particularly, although in its broader aspects not exclusively, to a radio receiver which incorporates means for concurrently recording several live broadcasts which may be selectively replayed at a later time.

BACKGROUND AND SUMMARY OF THE INVENTION

It is a leading object of the present invention to permit a radio listener or a television viewer to enjoy the programming they want to watch or listen to when it is most convenient.

The present invention operates by the concurrently and continuously receiving and recording a plurality of separate, simultaneously broadcast programs, and then selectively reproducing desired programs and desired times.

These and other objects, features and advantages of the present invention may be made more apparent by considering the following detailed description of a specific embodiment of the invention. In the course of this description, frequent reference will be made to the attached drawings.

DETAILED DESCRIPTION

In the following description, an overview of the hardware employed to implement the invention will be presented first, followed by a more detailed discussion of specific features and functions.

Hardware Overview

Figure 1:
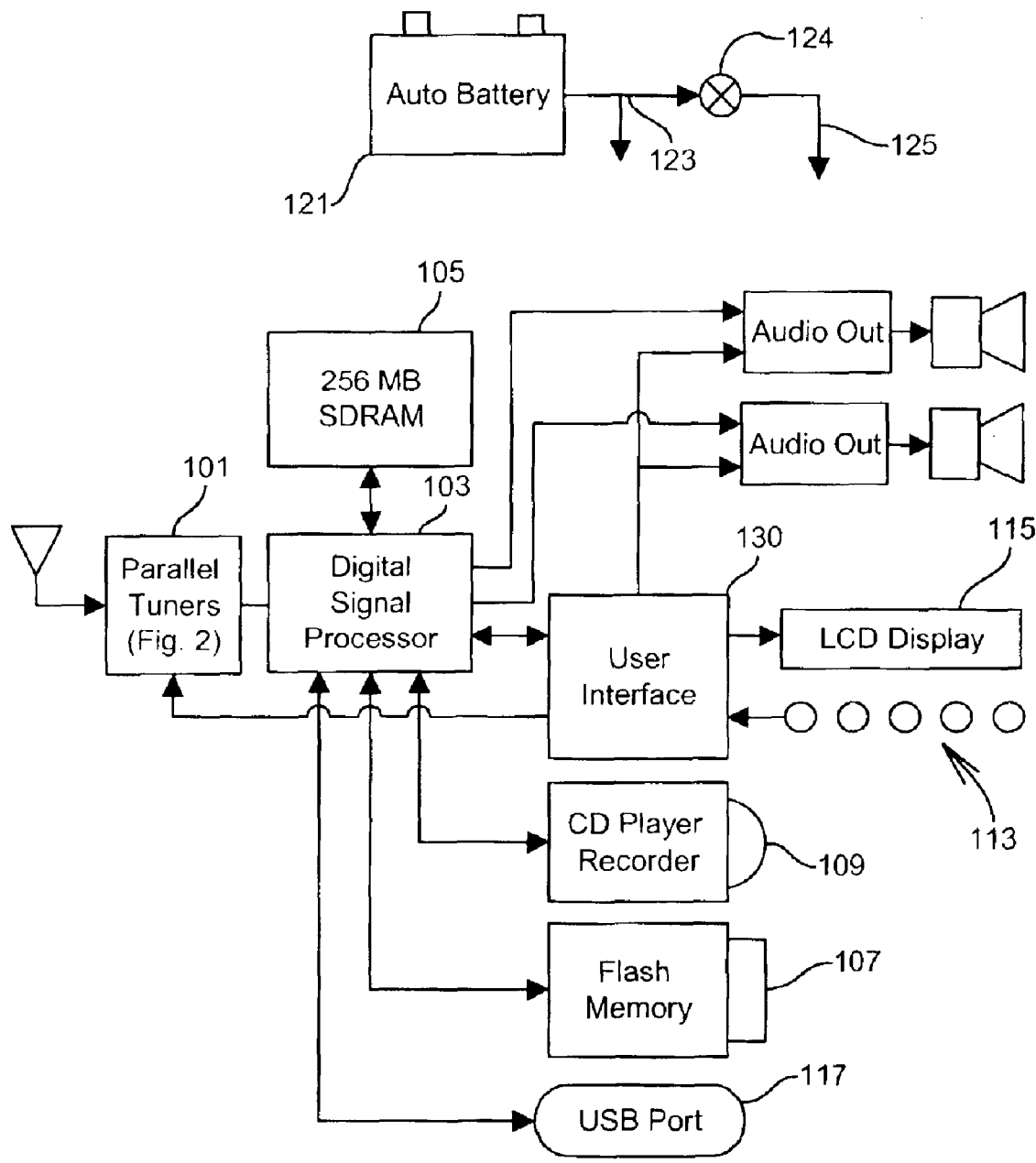
FIG. 1 is a schematic block diagram of a radio receiving system embodying the invention.

A car radio receiving, recording and reproduction system which embodies the invention is shown in FIG. 1. Although the specific embodiment to be described receives radio signals, and records and reproduces the audio program content of those signals, it should be understood that, in the main, the principles of the invention may also be applied to the reception, storage and playback of television programming as well.

Figure 2:
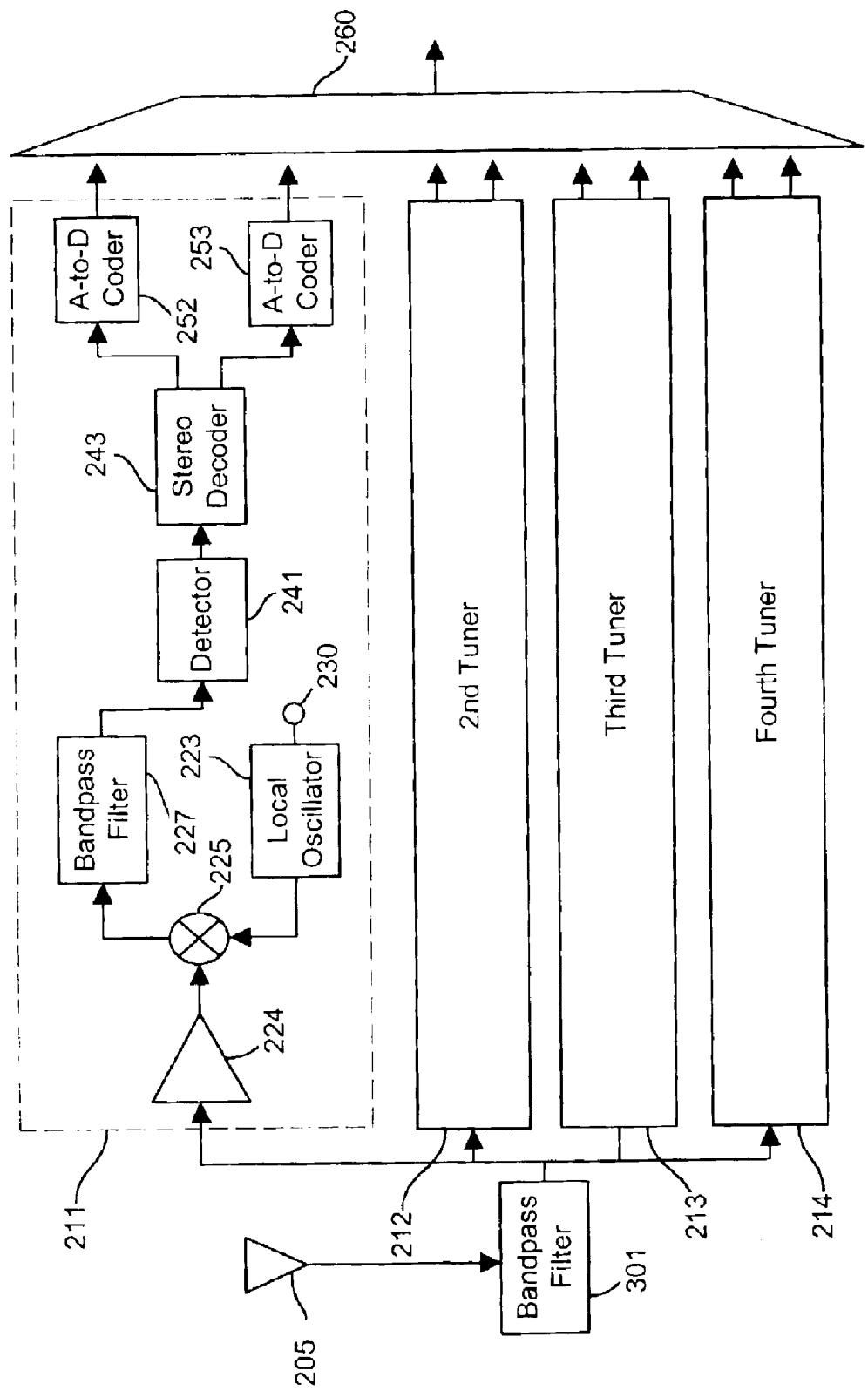
FIG. 2 is a schematic block diagram showing the details of the parallel tuner/encoder mechanism used to simultaneously receive and digitize the program content broadcast by several different selected radio stations.

The system includes a plurality of separate tuners and connected encoders, shown collectively at 101 and in detail in FIG. 2. Each tuner/encoder combination is capable of selecting a received radio signal and converting that signal into digital form. The multiplexed digitized content from the tuners and encoders 101 is passed to digital signal processor (DSP) 103 which compresses the digital content of each signal and stores the compressed signal in a high capacity (e.g. 256 MB) random access memory (RAM) 105. The DSP executes a variety of programs, to be described, which are stored in a program memory (not shown).

Program content selected by the user may also be read from or persistently stored in a writable flash memory 107, or on a compact disk using the CD player/recorder 109. The parallel tuners 101 and the DSP 103 operate under the control of a user interface control 111 that responds to control inputs from a set of pushbuttons 113 manipulated by the listener, and that operates a visual liquid crystal display (LCD) 115 for displaying information to the listener. An external data port 117, which may take the form of a universal system bus (USB) connection or a network port (e.g. an Ethernet connection), may used to exchange both digitized programming content and metadata that describes available programming content with a connected computer or device.

The system is preferably powered by the automobile battery 121 through a direct connection 123 to permit incoming radio signals to be recorded even when the car's ignition switch 124 is off, while a second connection 125 through the ignition switch 124 powers selected functions only when the car is in use. A small additional battery, as used in rechargeable cell-phones or laptop computers, may be employed in combination with a charger that operates when he engine is running.

Tuners and Encoders

The details of the parallel tuner unit 101 are shown in FIG. 2. The output signals within a desired passband selected by a bandpass filter 201 from an antenna 205 are fed to four separate, parallel, concurrently-operating tuners 211, 212, 213 and 214 which have like components but which are independently tunable to receive four different stations. As discussed in more detail later, a different number of tuners and encoders may be employed.

The components which form the tuner 211 are shown in detail in FIG. 2. An input preamplifier 221 has an output that is fed, along with the output from a local oscillator 223, to the inputs of a mixer 225. The lower frequency difference signal from the mixer 215 is passed through a bandpass filter 227 which selects the desired station. The unit is tuned by a control signal 230 (from the user interface 130 seen in FIG. 1) which controls the frequency of the local oscillator 223 such that the difference between the operating frequency of the local oscillator 223 and the broadcast frequency of the desired station matches the bandpass frequency of filter 227.

The resulting signal is then passed through a detector 241 and a stereo decoder 243 which produces audio baseband audio signals, one for each of the stereo channels. These two audio signals are then digitized by the analog-to-digital converters 252 and 253 whose outputs are passed to a digital multiplexer 260 which delivers the 8 digital output signals (two stereo channels for each selected station) as a single multiplexed stream to the digital signal processor 103 seen in FIG. 1. The reception system may be used to receive conventional broadcast FM, AM, IBOC and other digital transmissions, and satellite transmissions.

The number of tuners/encoders included in the system is subject to a variety of considerations. In theory, each listener has an ideal "skim rate". That is, assuming a certain type of content, a given listener might wish to surf through 2 hours of content in a ½ hour session for a skim rate of four to one. If the listener's skim rate is 4:1 and the unit includes four tuners, the user achieves "equilibrium;" that is, she can record content as quickly as she can consume it. In general, enough tuners should be included to ensure that the average listener does exhaust the amount of accumulated contend while skimming.

Note that, if the listener is tuning to live radio broadcasts, and not replaying programming from the jukebox or CD, during a given session, the demand for tuners and memory is reduced. To the extent the listener relies on "scheduled" programming, fewer tuners are needed to gather the requisite material (unless the desired programs were all on at the same time on different channels). With only two tuners, and the same skim rate and half hour listening session, the user could pre-store an hour of content and still have enough programming available for a typical "drive" in the car.

Data Storage

The data storage memory capacity of the RAM store 105 is a function of how often the listener wants to change channels. In the above example of equilibrium, (with four tuners and a 4:1 skim rate) if the listener switched channels every two minutes, she would only need eight minutes of memory in total. If she wanted to skim through half an hour of content before changing channels, she would need 30 minutes per channel or two hours of memory in total.

Finally, the demand for jukebox storage space might be quite vast to permit the user to tap into large volumes of radio content from which to gather songs. Allocating storage between jukebox and radio listening should be organic— with a person's changing tastes and perceptions about the value of what has been stored dictating where to draw that line. Currently, DRAM costs about 10 cents a minute or 40 cents per song. Flash upgrades could cost four times as much. These costs should drive the prospective size of the jukebox memory. Long term, small footprint hard drives or some removable media could be employed to increase storage capacity and portability specifically when in use with the jukebox.

A CD player/recorder capable of playing conventional CD's and further capable of recording programming which the listener has stored in RAM would permit the listener to persistently record favorite programming. The player/recorder 109 may thus act as an MP3 player/recorder, allowing the listener to replay music and programming using CDs created by a personal computer, and would provide a convenient mechanism for offload content that has been saved in RAM.

In addition, the unit may be provided with a flash memory port 107 for accepting removable flash memory cards or memory sticks, which currently would permit 256 MB of non-volatile memory to be added for approximately $100.

External Data Connection

Ideally, the unit would have some form of connectivity to permit data exchange with remote devices. This data exchange capability can take place using removable media (CD's, memory cards or memory sticks) with the CD recorder/player 130 or the flash memory port 107, or by means of a data port such as the USB port seen at 117 which may be inexpensively incorporated into the unit. The data port may also take the form of a wired or wireless network connection, or by receiving data in the form of broadcast radio signals. Regardless of the mechanism employed, the external data connection may be used to:

a. Upgrade the software over time (a potential revenue stream);
b. Receive data needed to provide an electronic program guide;
c. Receive signature or signal fingerprint data used for functions which are implemented using program recognition; and/or
d. Receive metadata for identifying and describing programs and program segments to facilitate recording and playback of content desired by the listener.

Power Supply

Due the importance of recording scheduled recordings even when the listener is not present, it is important that the unit have access to a car's power supply when the engine is off, as illustrated at 121–124 in FIG. 1. Alternatively, the unit may incorporate its own battery supply (recharged from the car battery) so that power will be available when it is needed. The OFF/ON condition of the ignition switch, and other operational data from the automobile's control system, may also be used to advantage to control the radio reception system of the invention; for example, by detecting when car is not running or in park, the functionality available to the operator may be altered so that, for example, complicated menus under the Information button are only displayed when it is safe to do so. When the ignition has been in an OFF condition for a predetermined length of time (e.g., 36 hours), the unit may be powered down to terminate recording and battery drain so that the battery is not significantly discharged when the car is not in use for prolonged periods.

User Interface

The system's user interface 111 is connected to control the stations selected by each of the parallel tuners 101 and the processing performed by the DSP 103 in response to the operation user controls, including a set of pushbuttons 113, each of which is visually associated with a descriptive label (either a permanently affixed on or near each button, or displayed adjacent to each button on the LCD display 105, permitting each button to operate as a "soft-key" whose function in a given operating mode is shown on the LCD display).

In one mode, each pushbutton may be used by the listener to select programming from a particular station in the same way the pushbuttons are used on a conventional car radio.

In another mode, the five buttons may be used to selectively perform the following five functions not available on a conventional radio:

Pause: suspends the reproduction of the live or recorded programming currently being played. If the pause button is pressed during live programming, that programming continues to be recorded for later, time-shifted playback. Note that there is no distinction between pausing and turning the radio off, since the radio continues to record and so is never "off" in the normal sense.
Save: permits the listener to save the complete content of a live program currently being reproduced;
Jukebox: switches the unit into "jukebox" mode in which the listener can select and playback previously recorded programming;

Mark: allows the user to "bookmark" a specific position on a program being recorded (or previously recorded), thereby permitting the listener to easily return to and resume playback at the marked position;

Options: permits the user to obtain information about available programming, or to perform less frequently used functions.

Due to the enhanced navigation capabilities of the system, fewer settable program selection buttons ("presets") selections are required. In addition, there should be a diminished need to surf from channel to channel, particularly outside the stations that are being recorded. When in radio mode, then, the skip and scan buttons would not switch to different stations, but would resume playback at different bookmarks within the recorded content of a given station. (The unit's skip and scan buttons would retain their conventional functions when the unit is used as a CD player.) In radio mode, to change stations, the pushbuttons would operate as conventional station selection presets, and a tuning knob of station-scanning pushbutton(s) may be used to select other available channels.

Using the Options button, the user can select specific channels as "standard" channels to which one of the tuners/encoders is assigned and which thereafter is always recorded. When the unit is first used, the first two FM and first two AM presets will be the "standard stations." The user can change the mix of FM and AM standard stations by going into the Options menu. A red LED (not shown in FIG. 1) will light up to indicate when a preset becomes a standard (and recording) station.

To assign a new frequency to a preset, the listener simply tunes in the new station, and presses and holds the appropriate preset as she would with a normal car radio.

The Audio Track and Macro-Navigation

In one embodiment, four presets will be connected to four tuner/encoder sets, all which would be continuously and simultaneously recording content when the car's ignition switch 124 is turned on. In addition, when the ignition switch is off, the unit will record programming on a scheduled basis preset by the user. If enough power were available, the recording into the buffer could be continuous, so that whenever the user got into the car, there would be buffered content available, permitting a predetermined duration of prior programming to be replayed on any one of the selected channels.

Each assigned channel may be recorded continuously, or when the ignition switch is on, by operating the RAM store 105 as a circular buffer as described in my U.S. Pat. Re. No. 36,801 issued to James D. Logan et al. entitled "Time delayed digital video system using concurrent recording and playback." In this way, whenever the selected station is broadcasting, the most recently broadcast material would be stored, continuously overwriting the oldest programming from that station. The duration of the most recently broadcast programming available from each selected station might be independently selected so that, for example, a station selected for its frequently repeated news and weather broadcasts might be allocated only one-half hour, whereas a station which broadcasts a favorite genre of music might be allocated 24 hours.

Settable selection buttons ("presets") may be assigned a frequency the way they are on most conventional car radios—by tuning in to a new station and then holding down the button for a couple of seconds. These first four presets could be assigned to "standard stations". Listening to stations outside of the selected four would be "roving", and could be done under one of four scenarios:

(1) A first approach would employ four encoders and five tuners. There would not be any recording or buffering of a non-top-four station. The four encoders would stick with the four tuners covering these presets and the fifth tuner could rove to other stations to other stations but not record them. This approach is useful when the roving is transitory, as the only use for such buffered recording is to replay something if the listener missed it. The unit would not build up any content ahead of the point currently listened to, so it would not be possible to skim forward.

(2) Another, perhaps simpler, model would employ the same number of tuners and encoders and reserve one extra encoder/tuner set for roving. This extra reserved encoder would record and buffer content from of the "last-roved-to station" when the user goes back to one of the standard stations.

(3) Another variant on this would be to offer a simple and short buffer for the roving station. Under this plan, the roving station wouldn't store long term content, but rather provide only "VCR-like" functions (pause, instant replay, etc.) within a limited duration buffer.

(4) The simplest approach is to assume that only the four standard stations can record. If the listener roves outside of those there is no recording and no buffering.

Scheduled programs may be logically placed in one of two places as presented to the listener.

The simplest model would have scheduled recordings inserted on top of the respective station's buffer of recorded content. In other words, the stored content is arranged in order of the time it was recorded and sorted by station (and accessed via a selected preset button). The combined content fro a given tuner (station) is called an "audio track". As a result of this combination, no special access means would be needed to get to scheduled programs—that would just be there imbedded in that station's audio track. If the buffering is going on continuously or after the recording is made, the content that comprised the scheduled recording would not be purged as the circular buffer rotated but would remain on the top of the audio track; that is, programming which has been scheduled for recording is protected against premature erasure from that station's circular buffer.

This first audio track model also solves the problem of listening to a station while a scheduled recording is in progress. With the merged audio track solution, if the listener schedules NPR to record from 7–9 a.m., and listener tunes in at 8:30, the scheduled recording will merge with, and actually be the same as, the newly buffered material. The scheduled recording will then be at the top of that station's audio track.

The second model for storing recorded programs would have separate storage for recorded shows. Separately recorded programs may even be accessed under a separate "program" button, which could be used to access and record programs. To solve the problem of what happens when the listener gets in the car and a show is being recording off the station being listening to, the unit may store portions of the program in both the buffer as well as in the designated program storage location.

Erasing scheduled recordings may be done in several ways. For regularly scheduled programs, the last installment is overwritten when the new one is recorded. If the program was a one-time recording, it is overwritten, with the space going back into the general buffer pool, as described later, after it has been surfed or listened to in its entirety. The content gets put into the oldest part of the buffer (i.e., becomes eligible for erasure) to accomplish this overwriting.

The removal of the overwrite protection and placement of a program in a recycle bin of the buffer could be done in one complete action once the program is finished, or done in stages as the show is listened to. A multi-minute delay before placing the recorded content in the buffer may be used to allow the user to jump back while listening to the show.

For macro-navigation, a long press of the bi-directional skip button would take the listener to the beginning or end of the station's buffer. This approach may be made more granular (when sufficient memory space is available) so that bi-directional skips resumes playback at to the last "major bookmark". These major bookmarks would include:

a. The beginning of the audio track for each preset (the oldest material);
b. The end of the audio track (the "Live" playback position);
c. The beginning of each scheduled recording;
d. The beginning of a segment of buffered content (of it at least, say, two minutes duration);
e. The Last Listened-To Point (LLTP).

Using the LLTP bookmark, when the user gets into her car, gets on the road a minute or two later, and then switches channels, the unit does not jump back two minutes, but instead jump back to the beginning to the show last recorded on that channel. This is similar to the way CDs operate where, if the listener skips backward before getting too deep into a song, the unit resumes playback at the beginning of the previous song (track). This LLTP bookmark is useful when the user is running errands and gets out of her car frequently. When the user returns to the car, playback may be resumed.

Different audio tones may be issued as cues to indicate the type of boundary that has been jumped to during navigation. Alternatively, an audio announcement could be made, at least initially as a way to train the user what the audio cues mean, and then the announcements can be cancelled by the user.

Micro-Navigation and Client-Side Markups

Bookmarks are particularly useful to permit the user to navigate between songs and talk, and from song to song. The same bookmarks may also serve to delineate segments that are to be saved via the Save button, as described below. Music and voice bookmarks may be generated in the following ways:

(a) Using the programmed DSP 103 to execute Fast Fourier Transforms (FFT), the stored program content may be analyzed and classified into music or talk, placing a marker between the presumed switchovers. Two "discrimination engines" may be used to continually evaluate the probability of a piece of content belonging to either class. An algorithm dependent on both probabilities may then used to position bookmarks which delimit talk and music. In addition, the algorithms also can frequently discriminate one song from another. Accordingly, when two songs are placed back to back, the algorithms construct an estimate of where the transition is and creates a dividing bookmark.

(b) "Song fingerprints" (song ID technology) can be used to identify songs. The beginning and end of a song may be determined from data provided with the fingerprint data which specify the time durations which separate the start and finish of a song (or other identifiable program segment) from the time position of the detected fingerprint. A delayed further offset could be used to account for the usual DJ talkover at the beginning of a song so that the bookmark might be set into the song somewhat so that, if talk is detected after the expected start of the song, the delayed offset position may be used.

The ideal marking technique would combine both of these methods, and thus offer several advantages:

While the classification method can mark off the DJ talkover nicely, it does produce errors; i.e. false markers and missing markers. False marker errors associated with the classification method could be detected with the Song ID technology and the false markers deleted.

The Song ID approach could also highlight the presence of a missing mark. Such detection could prompt the algorithm to re-analyze the content in the approximate location of the missing marker. The re-analysis would be done with new parameters that reflected that fact that there was a marker in the vicinity. If no split were detected, the bookmarking mechanism would perform the split, for example by averaging out the two split points deduced from each song.

The bookmarking mechanism eliminates the need to run all the music content through the splitting process, since only those areas thought to be close to a split need be analyzed.

As there is a lot of music in advertising blocks, the music bookmarks will only be set when a solid block of music equal to or greater in length than the minimum song length, at least two minutes, which is much longer than the music content found in advertising.

Other forms of micro-navigation the provision of a 30-second (or other predetermined duration) skip button, and the use of analog fast forwarding (preferably while playing a listen-able time scaled version of the audio, and skips to micro-bookmarks.

Micro-bookmarks for talk shows may be produced by using speech recognition to identify specific words such as "news", "sports", "traffic", etc. This approach may lead to too many false marks, however, as these words may be overused in the content and would have to be recognized across a large number of occurrences. Selecting only the first instance in a cluster would help minimize this problem.

Other words or phrases to look for would be segueing phrases ("Thanks for calling", "Welcome to the show", "When we return", etc.). Other sounds which could be detected to create bookmarks include laughter, applause, crowd noise at a baseball game, silence, deep breaths and other sound effects. The excitement level or speed of a person's speech may also be determined to provide information used to separate program segments. The bookmark might be best placed a few seconds before these sound effects.

A different approach from word recognition (across different speakers) that may be employed is the automatic recognition of repetitive patterns on talk and news shows that are used over and over in the same program or on multiple days. These sounds may well be part of the show format. Repeating patterns can be detected and saved. For example, a news station may repeatedly announce traffic reports with a phrase such as s "Traffic on the Threes." Such patterns repeating patterns can be detected used to determine bookmark positions that are useful for navigation and segment saving. If an audio artifact was typically at the beginning of an ad block ("We'll be right back after this"), a bookmark could be placed two minutes or more after the artifact.

Different voices (different speakers) may be detected using speaker identification analysis to place a bookmark when a new voice appears, when a voice reappears after a certain time period. If the host's voice is known, a bookmark may be placed each time a voice that was not the host's appears. If music is detected in the background on a talk show station, the segment may be assumed to be an advertisement. To ensure that these, and other auto-generated bookmarks, do not appear too frequently, only using the first instance of closely spaced similar detected event would be used as a bookmark.

Time based bookmarks may be used to identify normal program breaks, such as on the hour and half hour.

Metadata, including predetermined time positions, fingerprints and other audio patterns for music, individual speakers, repetitive events, and other detectable bookmark events, may be downloaded to the unit in a variety of ways as previously noted. In addition, as discussed above, bookmark events may be detected by signal analysis. Events designated by both metadata and by signal analysis may be used in combination to determine bookmark locations. When a show is first scheduled, the system could inquire whether the user wanted the show to contain any time-based bookmarks. When using speaker recognition techniques, speech samples of the known speakers on each show may be provided in order to construct bookmarks when speakers change. The system may also deduce which bookmarks and types of marks are of value over time by observing which type of marks any individual user makes use of.

The system can further analyze usage logs from an aggregation of users to determine whether people are not making use of a particular bookmark. When a significant number of users don't skip right after having landed on a playback point designated by a given bookmark, it may be assumed the bookmark provides a useful demarcation point; otherwise, the bookmark may be deleted from metadata provided to later listeners.

Bayesian probability techniques can be used to refine the use of auto-generated bookmarks. In particular, the time duration between breaks may be an important piece of data indicating the probability of another break coming up. Programs may employ a frequency distribution indicating how often separate segments identified by automatic bookmarking occur. As time progresses with no bookmark indicating a change in topic, the more likely a change is to happen soon, and the parameters in the search algorithms may be adjusted accordingly.

A user may adaptively train the system to look for the right repeating sounds to use as bookmarks. Training is performed by creating bookmarks at locations where a recurring bookmark would be desired and erasing those of limited use that the system had automatically created. The creation and deletion of bookmarks is more fully discussed below.

Note that many or all of these bookmarks could be embedded in a digital or even analog radio signal with the cooperation of the broadcaster. Emerging satellite and digital terrestrial broadcasting systems which can be used to particular advantage with the program storage and playback capabilities provided the unit may imbed bookmark information and other metadata in the signals transmitted to the unit.

Audio Tracks

The system may advantageously utilize "user-generated audio tracks" which users create by editing recorded audio tracks. In this system, the system would record long strips of unmodified audio, or audio with detected talk removed to form a continuous music recording. The listener would then listen to recording, using the available analog navigation tools. When the user wanted to create a bookmark, an input signal from the user would be accepted. After one or two listening sessions, the most desirable segments would by identified and delimited by these user actions. The benefit over the automated markup mechanisms described above is that the unwanted songs are never designated in the first place. User-generated audio tracks require greater effort by the user, but are most useful to willing participants who enjoy the creative effort required.

Another way to get to roughly the same result would be to let the user surf through, and listen to, the raw audio track. The system would then start to place bookmarks in those places where the user actually listens at normal speed to a segment over 30 seconds long. In this way, the system semi-automatically determines where the good songs and other desirable program segments are recorded.

In another model, the bookmarks would be deduced by aggregating and averaging multiple bookmarks from multiple listeners thus creating community bookmarks to be used for the same purposes above.

Under either scheme mentioned above, the system could start to delete content not of interest or not being listened to in order to conserve storage space. It would be a form of "use it or lose it".

In place of a jukebox, the system could save bookmarked and edited audio tracks as discrete units. Users could access and play specific audio tracks (with the new bookmarks added and unwanted material deleted over time) on demand. Tools may be provided to permit the user to reorder the segments (songs) in the audio track (but not to exchange segments with other tracks to avoid confusion).

The CD player/recorder seen at 109 in FIG. 1 may be used to allow the listener to burn CDs which preserve the edited audio tracks.

A Cooperative Business Model

The device may be adapted to support negotiated business rules that would control the usage and construction of the audio tracks, the jukebox, and resultant CDs. These rules might mandate a certain amount of the original advertising be left in, or that certain songs only are allowed to be played a certain number of times, or that less popular songs are played along with more popular ones.

Various subscriptions fees could be associated with various uses.

If acceptable business rules were agreed upon, the radio stations may supply the metadata, or alternatively the record companies may embed the data in the recordings themselves.

Another business model would have the radio stations, in conjunction with the record companies, broadcasting songs (preferably late at night) to permit recording and collection at the client side by the recording device. This model could be a means for "distributing" CDs to paying customers.

Where to Start Listening

What happens when a user leaves a station and comes back to it? Either because they paused the system, changed channels, or left the car?

One option is that listener always starts at the live radio playback point, as they would with a normal radio. While this similarity has some benefit, starting with live programming would make it more tedious to go back to the point at which the user paused.

A second option is to start up at the last (previous in time) major bookmark. If there were no recordings that occurred in the interim, that would take the listener to the LLTP. For short breaks, this option does exactly what would be expected if the listener paused the station. If the listener is out of the car for a while and a scheduled recording occurs, then the unit will start up at the beginning of that scheduled recording. If the unit has not been playing a given station for a predetermined time (say, 20 minutes), and there is no scheduled recording in the audio track, playback will begin at the beginning of the audio track (which at that point would be operating as a buffer holding a predetermined duration of the most recently received programming. To get to live radio, the user would traverse forward just once using the major bookmark button.

Rather than starting at the live or LLTP positions, an experienced user may want is to start surfing through recently stored material, not yesterday's content found at the LLTP, which will be too old. Going to live, on the other hand, may often be too slow paced for experienced listeners.

Content may be placed in a large buffer that is constantly recording 24 hours a day for some or all the recording stations. By using devices which consume little power, sustained operation using the car's battery is practical, particularly when a time limit is included to power down the device after an extensive period during which the battery is not recharged. As a result, the buffer is always full when the user gets in the car. This buffering should be performed in a way that does not over-write any scheduled recordings stored in the audio track or content surrounding the LLTP from the day before.

For music stations the last major bookmark would probably be the LLTP as users will seldom schedule music programs or care about the time-of-day when listening to music stations. As user's may skip over much of the DJ talk, and just go from song to song much of the time, any out-of-date comments made about traffic or weather, etc. will be skipped. Thus by following the rule of starting at the last major bookmark, the starting point for a music station may be the left-off point from the previous day.

Regarding another question relating to pausing, attention should be given to the issue of what to do when someone leaves the car. (Thus solving that age old conundrum: Do I sit in the car and listen to the rest of this song or talk show segment, or leave the car and forget about it?) The simplest approach may be to record additional material from the station being listened to if the listener is 15 fifteen minutes or less away from live listening. So if the user were listening live when the car goes off, another 15 minutes would be recorded. If the user were listening 5 minutes away from live, the system would record another 10 minutes of content. In all cases, the listener would always have available 15 minutes of content from the LLTP of the last station listened to.

Whether to startup again in Live or the LLTP is a decision that could be left up to user who could make such a selection in the preference menu. Alternatively, the On/Off button which pauses the radio, could be designed such that pushing it in and out turned the unit off and paused it (and so turning it back on would bring the playback point to the LLTP), while turning the button counterclockwise would shut off the radio, in which case the listener would wake up in live radio. In this way the user could make the decision on the fly.

Ways to Listen, Downloaded Markups

Metadata may be employed to control playback in the same way that it was used to control television program playback as described in the previously identified patent applications including U.S. application Ser. Nos. 10/060,001 and 10/165,587. Using these mechanisms, timely metadata may used to identify and categorize segments of recorded talk or news (which could optionally be run through a preference filter). The user may playback identified segments continuously, or use the metadata to surf. The result would be a personalized news show. The metadata may be supplied in one of several ways: It may be pushed to the client playback unit either through a point-to-point wireless link, embedded in a broadcast stream, or transferred to the system in batch mode such as via a CD or file transfer from of a Palm Pilot. In either case, the download vehicle would not know exactly what had been recorded and what metadata was needed. Available metadata (or a subset that a specific user might need) would be supplied and the client software would select the needed metadata and match it up with the content. For a push-wireless system, a broadcast carousel system in which the metadata streams by and the client software select the needed elements, may be used. The metadata may be embedded into the FM sideband of another channel. With a multituner system, a low-priority tuner would be used to go pull data of this stream as needed to bring in the metadata. A further method places the metadata in an IP-over audio stream.

Note, by employing a download capability, the metadata to which identifies and describes news and music segments (applications called "NewsCatcher" and "SongCatcher" respectively) can be supplied by the listening public under the "community markup" methods described in the above-noted applications. Under this plan, people could mark up shows using their own listening software and upload the resulting metadata to a shared server for download to others.

The audience itself could generate community-generated bookmarks if there were a back channel (a client-to-shared-server link) to collect them. With such a back channel, the shared server metadata may identify "Hot Spots", a guide to the most popular segments. In addition, by monitoring listeners' use of navigation controls and time scaling, and analyzing such usage patterns, useful bookmarks may be automatically generated for the benefit of other users who listen to the same programming at a later time. As many people will presumably be using time scaling as a way to skim until they come to something interesting, the analysis performed at the shared server can identify those locations where people tend to be slowing down to listen carefully and designate those preferred segments with bookmarking metadata. These deduced bookmarks would then be downloaded to later listeners.

As users can create their own bookmarks, these too could be collected for shared use using the back channel. When consistent usage patterns are observed, these user-generated marks could be passed along to later listeners.

Other Ways to Listen that are akin to the "condensed shows", "previews" of shows (audio trailers), and "highlights" of talk shows described in the above-noted previously filed patent applications.

Voice recognition may be used to construct the text of spoken word content. This text may then be analyzed for meaning with AI tools and a summary extracted. This summary may be displayed on the LCD 115 or spoken via a text to the audio output.

Audio content may be previewed by playing back highlight segments in a scan mode where portions of each highlight segment (based on time or content-based bookmarks) are played for a few seconds. An audio index could be constructed by using metadata to capture a key sentence from each segment to be used in the audio index. The system could read these in a predetermined order and the listener could randomly access each in turn through a voice command or button action.

There are also novel ways that music may be played back. For instance the musical equivalent of a television "favorites" playback may be constructed by specifying the musical group (or speaker for a talk show) the user is interested in hearing and the system could assemble those songs or segments for automatic playback. This may also form a useful way to rearrange the listener's saved selections (jukebox)—by artist.

Another variation in music playback would involve modulating where the marker for the start of each song is placed. A user preference can be set to tell the system whether the user would prefer to have the marker after the DJ talkover had stopped, or to have the marker placed where the music is first heard in the background (even though the DJ is still talking), or at an even earlier point providing for more of an intro. (This was discussed above where it was suggested that the user might want to land within the song so as not have to go through the talkover.) If the marker were placed after the DJ talk, and the user decides he or she wants to hear the whole song even with the DJ talkover, they could hit the back skip button and it will go to the location where the mark might have been under the other decision rule at the very beginning of the song.

A "scan" button may be used when navigating time-shifted content. In operation, the scan button when operated moves the playback point to each bookmark in sequence and lets the listener set the amount of content played after the bookmark, the length of which might vary depending on whether the content was talk or music, and what type of bookmark was encountered. If the time between bookmarks was too long (for instance, with a talk-show for which no markup metadata was available), then a skipping pattern using preset time jumps, or jumps to automatically detected audio events, could be employed to allow the user to scan through the content of a recorded audio track.

Another variation on the scan function could take the listener to a point in time in the segment that is after the bookmark. This would give listeners a quicker sense of what the segment was about than starting at the beginning of the segment. (This in essence is the way a conventional radio scan button operates, by taking the listener relatively deep into the content by virtue of the fact that it is non-intelligently jumping into a broadcast stream in process in the channel (station) jumped to.

Songs are known to have a "sweet spot" in them—a spot that resonates with, and is quite familiar to listeners. It is the segment that often is represented on sampling websites where listeners can hear a 30 second snippet of each song. Quite often this segment will be the refrain and include the name of the song as part of the lyrics. Sweet spots may be used in another form of "scan-listening" in which the playback jumps to the sweet spot in each song. If the user likes the song, he or she can hit the back skip button to go to the beginning. This concept could be used both for buffered music content and with songs saved into the user's jukebox. The sweet spots may be identified by downloaded timing metadata or isolated using the DSP to perform song identification.

When a song is played back, and the Song ID system is employed, the song name and artist will be displayed on the LCD 115. To supplement that, the system could use a text-to-speech system to say the song and artist names so the user wouldn't have to take his or her eyes off the road. Alternatively, audio clips of someone pronouncing the song and artist names could be downloaded for better audio clarity.

Given the up to 10:1 ration of storage needed for spoken word compared to music content, storing these names would be an insignificant amount of overhead if it was only being stored for recorded songs. Storing the identifying sound clips for the whole database would require extensive and expensive storage capacity. To conserve space, the metadata server may download the audio name clips and other descriptive metadata only after recorded songs were identified at the player and their identity sent via the back channel to the metadata server.

Menu Functions

Enhanced features could be accessed through Menu functions that would be accessed through the "Options" button (one of the multi-function, user-actuated buttons indicated at 113 in FIG. 1). These functions may include but are not limited to:

(a) Scheduling recordings and changing the schedule;
(b) Rearranging playlists;
(c) Preventing the overwriting of stored content;
(d) Perhaps labeling songs if there is no Song ID available; and
(e) Setting various preferences. While different preferences could be set for different occupants of the car, chances are the different occupants listen to different content. As such, the same effect can be achieved by offering preferences for different shows, stations, etc.

While accessing these functions through a menu system could be somewhat tedious, the actions done not need to be done often.

The menus could be presented in any of the following ways:

The menu options may be read aloud via the audio output to communicate a list of choices. The options may be presented either in a timed sequence, requiring the listener to respond at the right moment, or by invoking the reading of each choice with a button action, providing the user with audible feedback on choices made without the need to watch the LCD display.

Alternatively, the menu may scroll through a list of choices, which would be presented on the LCD, using the bi-directional seek button.

The user could select an offered menu item by either hitting a button, or using voice input. A simple voice system may be used that accepts simple replies such as "yes" or "no" from a range of users. Alternatively, the system could be trained to understand the operator's voice, as some cell phone systems do today. If the voice command recognition system simply recognized letters and numbers, voice input could be used to input data by spelling it aloud. A more advanced system could dispense with either the presentation of the menu choices or spelling, and allow the listener to speak the names and times to be provided as input, as is done in the voice recognition systems used by some call center and message handling telephone interfaces. A cell phone or other bidirectional connection may be used to connect the client unit to a robust voice recognition and command system operated as a shared telephone, a Web service or the host metadata service, which would return command signals and/or metadata for controlling the client unit.

Another non-menu-based method to input data takes the form of a "scrolling alphanumeric keypad". Under this system, the user could use the scan button to scroll through a list of numbers and letters on the LCD screen and select each character one by one, using the buttons 113 as "smartkeys," in the same way that users input their name or initial into the "Highest Score" screen of a video arcade game. For numbers and specifying a.m. or p.m., this scrolling alphanumeric keypad would be relatively fast and precise.

Another potential interface would piggyback on the cell phone interface. If the cell phone keypad was interfaced to the system, for example using a Bluetooth® link (see http://www.bluetooth.com), the needed alphanumeric data could be typed into the cell phone using its keypad and display screen, with which the user would already be familiar. Other portable devices whose in-car interfaces the system could piggyback off of include Palm Pilots, and notebook and tablet computers, which could communicate with the system via a USB port, a Bluetooth® or other radio link, or an infrared connection.

If the system had the benefit of exchanging data with a host computer via an MP-3 CD, flash module, or a wireless network connection, menu selection could be done on the host computer and the results transmitted live to the unit, or downloaded in advance as a playlist to the car unit. Making choices using a PC Web interface would be provide substantial ease-of-use, safety and flexibility advantages. Alternatively, a robust interface, such as a touch screen LCD, provided by the unit itself would facilitate the menu presentation and selection being made in the car.

Depending on safety concerns, certain functionality should only to be used when the car is not being driven and would be inhibited when the car is in motion (or not in "park").

Scheduling Recordings

Scheduling a recording may be the most important function requiring a menu interface. A specific example is outlined below to serve as an example of how the menu system preferably operates.

To schedule a recording, the user would:
 a. Select the Schedule Recording option from within the menu presented under the Options button or under the Programs button if that were present.
 b. At the audio or visual prompt, specify which standard station will be recorded by hitting that preset button.
 c. Select a beginning time and end time from the menu of choices.
 d. The system would announce (audibly or visually) how much time was left for other purposes and the listener would have a chance to undo the scheduled recording.
 e. Choose a "frequency option" from: this day only, everyday, all weekdays, individual recurring days of the week, or weekends.

Scheduling recordings should be a car-off activity. Given this fact, and the fact that scheduling isn't done frequently, more complex features may be provided for the "power user" invoking this feature.

Other scheduled recording features that could be made available, at the risk of further complication, are described next.

Creating a scheduled recording from a non-standard station: Under this scenario, a station to which the user did not want to devote a tuner/encoder set might have individual programs worth capturing. The system may switch a tuner/encoder to that station at that time and record that station. The recording could be associated with the originating station (using a LED to indicate the presence of the recording on that normally-not-recording station). Leaving it there would not require any additional tuners or encoders.

Alternatively, the recording could be placed in the audio track of any one of the recording stations as if that station had recorded it.

While the model of recording a program off a non-recording station is understandable for content recorded during non-driving time, it could be confusing when driving as one of the normally recording stations would not be recording (as that tuner/encoder would be temporarily devoted to recording the non-standard station). The user will appreciate the consistency of always having content from the same four standard stations being buffered. Cutting out one encoder to go pick up a show from another station would break that paradigm, forcing the listener to choose which encoder to use. It would be especially confusing if we used the roving tuner/encoder approach.

Assigning a recording to go into the audio track of the originating station or that of another station: This approach would allow someone to put all his sports shows in one audio track and political talk shows in another, creating in essence, a "virtual channel".

If the separate Program button is used, or if the menu routine had enough options, programs could also be stored in distinct bucket, one or more for each preset buttons. In other words, the preset buttons could access bins within which to store and retrieve scheduled recordings. Again, these could serve as virtual channels.

A recorded program would be given some protection from being overwritten when it is put into a station's audio track. This would allow the listener to record her favorite gardening show from Saturday, and listen to it during the week without it being overwritten with day-to-day material. When invoking this feature, the system would inform the listener to what extent the capacity of the buffers had been reduced for the standard stations. One option would be to allow a recording to only be overwritten by the recording of the next episode only, as mentioned above.

To explore programming content from times of day that aren't normally experienced (but during which desirable programming may be recorded and time-shifted to the times when car is being used, and given that there is no currently available EPG (electronic program guide) for radio, a "recording scan" function may be implemented. This mechanism would record the first 10 minutes at the top of the hour for the whole day for a certain station. From this sampling, the user may elect to play back certain recordings, and the identity of these preferred programs thus be adaptively learned for later, more complete recording the following day or days.

With the benefit of being able to download EPG metadata in a point-to-point manner as previously described, the users could use a radio EPG on their PC to make future recording selections, with the selections being transferred to the unit to control recording. The same PC interface could also be used to operate other functions of the radio, as noted earlier. Alternatively, an LCD touch screen display on the in-car unit may display menus containing downloaded EPG metadata, and the recording selection then made from that easier-to-use interface.

The Save Button and the Jukebox

When the Save button is invoked, the content currently playing, either a song or other content, would be saved in one of several ways:

If live content is playing (and no bookmarks marking the content have yet been created), the system will save a predetermined amount (e.g. 10 minutes) of content surrounding the point when the Save button was pressed (e.g., the last five minutes and the next five minutes to be played). Bookmarks for that content would be created, and the saved segment could be trimmed later as described below.

If the Save button is hit while playing a recorded segment that has been bookmarked, the unit will save the segment defined by the previous and next bookmarks.

In a model where there were be no bookmarks delineating songs, the user may would hit the Save button at the beginning and end of the section that was to be saved. Audible or visual feedback may be used to indicate to the user that the first Save press indicated the start of a recording and the next Save action marked off the end.

Songs may be saved and assigned to the "Jukebox" in one of three ways:

The simplest implementation for saving songs is to simply hit the save button and the song (or the segment) being played would go into a single linear list of songs.

A step up in functionality would have each recording station have its own playlist. In this case, when the user hit the Save button, the song would go into a linear list (organized by date saved) associated with that station.

For more advanced users, the mechanism would allow a user hit the save button and then immediately hit a preset button. This would assign the song to a specific playlist of the user's choosing. In the simplest novice case above, where no preset was hit after hitting save, the song would go into a default linear list, which will be assigned to preset #1. In the second novice approach suggested above, the saved song would go into the linear list assigned to that respective station.

In all cases, the "original copy" of the saved clips or songs continues to reside in the buffer or recorded program. Until the original content is purged, there will be two virtual copies of the saved material in the system (the second copy being implemented by memory pointers which identify a corresponding segment in the buffer).

To access the jukebox, the user would toggle the AM/FM/Jukebox button.

The system could offer any number of playlists stored under the preset buttons by having this button toggle through AM, FM, Jukebox 1, Jukebox 2, Jukebox 3, etc. The user could set any number of playlists through the preference settings. As an example, with four hours of storage in available memory, the Jukebox might store two hours of music (about 30 songs); so one set of presets would be sufficient.

Novice users would hit the Jukebox button (and not hit a preset button after that) and the linear list stored under preset #1 would start playing from newest to oldest. The second-mentioned novice system would play the linear list associated with the station the listener was last on before hitting the jukebox button.

If a preset is hit after hitting the Jukebox button, the system will start playing from the playlist represented by that preset. (The "unassigned linear list" is represented by preset #1.) If another preset is hit at any time after entering jukebox mode, that playlist will start playing.

Whenever a playlist is accessed, it will start playing from the LLTP as if it were a CD that had gotten shut off. As mentioned above, playlists will always play from newest to oldest.

The Jukebox will also be able to employ the "random" and "shuffle" buttons if they are present in the system. These commands would randomly play or temporarily shuffle the songs in a given playlist.

A limitation may be imposed on how long a segment could be that was not manually trimmed (see about trimming below). That would prevent overly long segments from being dropped in by mistake (for instance, four back-to-back songs that weren't split apart with bookmarks.

A method to download data, such as a CD-RW player, flash module, other removable media, the USB port or a wireless connection to a portable CD or MP3 music player, a connection to a PC, etc., opens up the opportunity to have a jukebox that could include other music beside what had been collected off the airwaves. For instance, the user could put a CD into the player and hit the "save" button if she wanted to transfer a given song and store it in the Jukebox. Songs from MP3 players could be transferred digitally. The result would be a jukebox with songs off the radio, CDs, or MP3 players.

Alternatively, selected functions implemented by the receiving system described in this specification could take the form of features in other music systems that might be in a car, for instance an MP-3 jukebox with a hard drive. In this case, the reception and storage of broadcast programming would not be providing the "dominant" jukebox and a means would be necessary to place songs captured off the airwaves into that jukebox.

A method to upload content to another computer is also envisioned using a CD-R, wireless link, etc. This action would be done with a button sequence or voice command while the desired content is playing. If the reception system displayed a list of songs developed using its song recognition system, selected songs could be uploaded or written to a CD-R or flash memory card.

Content could be written to a car-based CD-R or CD-RW. Here it might be advantageous to only permit this writing function if the car is off or stopped to avoid skips on the laser-based media. The commands could be given at any time and the writing could take place later.

If storage space is not available for the complete fingerprint database needed for Song ID then the database could be broken into two parts:

(1) Fingerprints for the most common songs heard on the radio during a given period of time, and songs that the user had expressed an interest in either by saving them or including them on a Huntlist or Never Again list, would be stored on the client. These fingerprints could take up to 1K of memory each so their storage on the client may be limited.

(2) The rest of the much larger database could be made available in one of several ways:

(a) The first would employ a CD or other means to supply metadata. This database could be used to do Song ID in batch mode. A database of 700,000 songs would be more than sufficient for radio broadcasts and could be stored on a single CD. Each time the CD was entered into the system, fingerprints for new songs and other relevant songs needed for the database stored on the client would be transferred to the unit.

(b) In another architecture, a data carousel could be available via broadcast, allowing a larger database to be continually streamed to the radio and used for identification.

(c) Another architecture (discussed in the above-noted patent applications) would involve sending snippets of recorded songs (via a wireless connection) to a server for identification. Song ID software, which typically scans a complete user-supplied recorded song by a vendor-supplied fingerprint looking for a match, may be modified to transmit user-supplied snippets to the shared server, which compares the snippet with a vendor-supplied complete songs looking for a match. The supplied snippet is preferably could be taken from a standard time into a song's play in order to speed up the matching process. The latter method would also require that talk/music discrimination software be used to identify what content material is music.

This snippet approach could prove to be useful when trying to identify hard to identify songs and when it's difficult to get the entire database to the client. In fact, if there is a viable point-to-point wireless connection available, this may prove to be the best way to build up the database of fingerprints needed on the client, with snippets of unknown songs being sent to the server, and the ID information along with the fingerprint for future use being returned to the client. This approach may require less bandwidth than the alternative, which is to download a potentially larger number of fingerprints to keep the database full in anticipation of what might be recorded.

(d) If space for a fingerprint database were not a constraint, then the radio would be sold with a complete database of all fingerprints for all the songs that have appeared on radio in the last 40 years or so. The supplied data base then only need be periodically updated as new songs come out. Again, any number of one-way connectivity schemes can get this update metadata to the unit, including broadcasting it on a FM subcarrier, cell phone connection, or a CD-RW disk, etc. as noted earlier.

The Bookmark Button and Song Editing

If the product is to have a stronger music focus, given a device-adroit male target audience, more aggressive features may be incorporated into the jukebox, adding the ability to "trim" a song. To do this, the user deletes old bookmarks and creates new ones which more accurately delimit desired content.

To create a bookmark simply hit the Bookmark button. The bookmark will be inserted at that point in the audio content then playing. To delete a bookmark, simply skip to that bookmark and press and hold the bookmark button within a second or two of skipping to the bookmark.

Note that trimming could be done to material before or after saving it. That is, the user can use this bookmark process to setup material to be subsequently saved. This would be the means to clip ads, or talk content, or to cleanup songs (before saving them) that had errant bookmarks.

There could be cases where a song or clip was saved to the jukebox but still needed cleanup. This cleanup would be easy using the bookmark tool if the listener wanted to shorten the clip. By creating a new bookmark at the beginning of the clip, the beginning of the song or clip would be moved in to that new point. By creating a new bookmark at the end of the clip, the song would now end at that spot.

In some cases, however, the saved song may be too short. In anticipation of that problem it is proposed that some extra content be saved outside the bookmarked start and stop points of a song just in case the user wanted to move the bookmarks back.

To move bookmarks outside the demarcated song, the user has to have the ability to navigate past a bookmark. So if a song as bookmarked in the jukebox that "started too late", the user may move the bookmark back in time. While this could be done in several ways, perhaps the best would be to go to the beginning of a song (by hitting the skip button taking the playback point to the beginning of the next song in the playlist) and from there pressing the analog rewind button. Normally this would not do anything at the beginning of a song but in this case, it would move the playback point before the extra material stored in front of the start of the song.

By going backwards, the system knows the user is trying to re-specify the beginning of the song and will "add material" to the beginning or end of the song. The user can now reposition the bookmark within this new material in the standard way. For this approach to work with already saved content, it would require that the extra material be available before the beginning and after the end of each saved segment. This extra material could be saved for a certain time period and expunged after the song was trimmed or after the material had been listened to a few times with no attempt made to trim the material.

Another important use for the bookmark button would be to snip out talk or news segments the user wished to save. With appropriate connectivity, users could also bookmark content and send these bookmarks (or the actual content) to other users who had recorded the same content.

To delete a song or saved segment, the user would simply start to play the saved segment and hold the save button down for a few seconds. When pressed and held, the Save button becomes an Unsave button.

User Interface

The functions performed by reception system should be provided by an easy-to-understand, easy-to-use user interface that does not rely on a user's manual or on visual information (so that the driver can access commonly use features without taking his or her eyes of the road). To achieve this result, it is desirable to extend the functionality of familiar radio/CD buttons as much as possible.

Audio prompts may be used, but could be turned off in the Options menu or could go away after being used a certain number of times.

The unit preferably includes, at the minimum, a small LCD display seen at 115 in FIG. 1. This display would show station, artist and song name when available, recording status, and importantly, when time shifted broadcasts are being played, the relative buffer location being read relative to the "live" location.

A time bar would express relative listening position both with numerals as well as with a dynamic, variable length bar in which the Live playback point appears as the right-most point and the listening point positioned to the left. The bar could represent either the relative position of the listing point in relation to the whole bar which represents the total recording in the buffer, or it could represent absolute time (one hour, two hours, etc.). For playing back a Scheduled Recording, the time bar would not represent distance from Live. Instead, the full bar would represent the length of the entire show and the moving marker would show where in the program the listener was at that time.

As noted earlier, digital devices that have limited and restricted interfaces which employ useful interface techniques that could be incorporated into the reception system:

a. Voice Mail
b. Cell phones
c. MP3 portable players
d. Radar detectors
e. Microwaves
f. Cameras and camcorder
g. Clock radios
h. Digital watches
i. GPS navigation and positioning systems It should be noted that none of these products has the combination of computing power, power supply, memory, or the robust speaker system is made available by the recording/playback unit as illustrated in FIG. 1. As a result, an improved user interface can be provided to these connected devices.

The unit's audio interface may be employed to build in a Help Channel of audio information (with bookmarks to make it navigable) stored behind the Options buttons. Note that this Help channel could also store information about the car itself that the manufacturer might wish to have available to drivers on request. In other words, our audio system might be an infrastructure that the car OEM might wish to integrate with its system, supplying information that might otherwise have to be displayed on the dashboard. In addition to information on request, the car OEM could use our audio output system to distribute information when the driver didn't necessarily request it (a "push" application). For instance, the system could announce: "A 15,000 mile service is needed," or "The right rear door is not closed." In addition, the memory and communications capabilities provided by the unit may be employed to store GPS navigation maps, to store diagnostic information from the vehicle's computer, to store and display route and trip planning information from a connected PC, to store telephone and address information used by a cellular phone or PDA, etc., to collect and display traffic and weather information from local radio sources, to use its wireless connectivity to access Web services of use to travelers, etc.

Memory Allocation

The system will also automatically adjust some of the uses of memory over time, although nothing will ever be deleted from the jukebox automatically. While a standard buffer size for all four recording stations will initially be set, the length for each station could be automatically adjusted over time. The system may automatically adjust the buffer size by adaptively recognizing usage patterns. For a station broadcasting news, for instance, which repeats most of its content every 20 minutes, the buffer should be about 25 minutes. The unit may "learn" this duration by monitoring the listener's tendency to stay tuned for only 20 minutes on average each day and then jump somewhere else. Other people with very short commutes will seldom if ever skim through very much buffer space (while long commuters will go through larger amounts). In addition, some people will be skimmers and some won't.

If a given station's buffer isn't used, some of that station's buffer memory will be allocated to another use, which could be another station's buffer or the jukebox.

The other principal competing use for buffer space (in aggregate) is the jukebox. The system, then, will allocate memory between the jukebox and the buffers. There will be a default buffer size (say, two hours per station and eight hours in total). If the jukebox starts to impinge on that, the system will automatically let the jukebox take over "unused" buffer space. When that is gone, the system will announce verbally that more jukebox space is needed and ask the user if he or she wants to delete songs or shrink the buffer sizes more.

When recordings are scheduled, the buffer memory for each recording station's audio track will be automatically expanded to accommodate the size of the recording. This will, however, shorten the length of buffers for all stations. The user will be informed how a recording is impacting available storage, letting him make a decision at that time how to make any needed tradeoffs.

To save memory, the system will automatically categorize channels into talk or music stations. The confusing ones (like hip-hop) will automatically be dumped into the music class. Different encoding algorithms may be used for music and talk stations or perhaps even for the talk within a music station. Some stations switch formats at set times during the day, and this pattern may be used to reduce the burden on the processor to discern between talk and music on the fly.

Another way to conserve memory is to erase recorded content after it has been recorded, but before it has been listened to, if it doesn't fit the user's profile. There are several examples of where this could be used some of which assume the implementation of the previously discussed song identification technology:

(1) The FFT algorithms could distinguish one type of music from another and only keep the type that fit the listener's observed or stated preference.

(2) The system could use ID technology to identify commercials that have been listened to before and delete them.

(3) Songs that have been saved in the jukebox already could be deleted after identification.

(4) Songs on the Never Again list could be deleted, or the recording stopped at a mid-point, as soon as the song was identified (5) Songs that have been played frequently in the recent past could be erased. (Whereas a DJ attempts to construct an optimal playlist based on the assumption that you've heard all of it, this system feature would attempt to optimize the playlist based on what you had actually heard recently.)

(6) Segments of talk shows that are continually skipped by a specific listener (traffic, world news, etc.) could be deleted after recording if they could be identified via a metadata connection or on-board content recognition.

Conserving Processing Power

The digital signal processor 103 performs multiple tasks which are computationally intensive, including (1) Splitting (looking for music/talk boundaries and other similar breakpoints)

(2) Content (e.g. song) identification (3) Encoding (e.g. MP3 compression)

(4) Decoding (e.g. MP3 decompression (5) Time scaling

For music stations, the major horse power-saving action will be to minimize the combined load of splitting and Song ID by minimizing the amount of content that has to be processed by each step. In addition, it would conserve processing power if talk content used a different encoding algorithm. Song splitting can help efficiency by classifying the content into talk or music. As a result, ID work will only be done on music content, and the more efficient spoken word codec will be used on the talk portions.

Other heuristic algorithms may be used to cut down on power usage. For instance, by knowing the genre of the station, the usual playlist of the station being analyzed, and even the list of recently played songs, the Song ID function could look for the most probable matches first. When metadata of use in classifying a given audio track is to be made available on a delayed basis, automatic bookmarking, voice/music recognition, other forms of computationally burdensome analysis may be deferred until the metadata is available to reduce the complexity of the analysis.

Horsepower will also be saved when time scaling of talk stations is invoked as the decoding load is reduced as it's being done that much faster.

With a high speed processor and an efficient coding algorithm, encoding can be done faster than real time. In that case, an encoder need be allocated for each station. The content could be saved in un-encoded batches with the encoded alternating the station being encoding. As a preference setting, the time scaling feature could be automatic for certain types, or for all types, of talk radio.

The user could also have the option of choosing the level of compression desired and the quality of recording for both music and talk in order to modulate both memory and processing power usage.

If short buffers were acceptable under certain circumstances (for instance, when roving), or enough memory was available, encoding could be eliminated for some content with this unencoded content being stored for short periods of time (until over-written). If a section were to be saved to the Jukebox, it could be encoded at that time.

Potentially, once the system had identified segments as talk, or specific segments of talk (such an ad being rerun), or specific songs, it could take the action of not encoding or saving these portions, already saved songs, songs that had been skipped over before, ads that had been listened to before, or other unwanted content.

Alternatively, unwanted songs (as indicated from a Never Again list, for instance), once identified, could be ignored and not run through the splitting process. Alternatively, only new songs or songs on a Huntlist could be split out.

If much more content was being saved than actually being listened to, the system could save horsepower by doing the splitting as needed, "on-demand", so to speak. That is when a listener switched to a channel, the content being listened to could be decoded, split, and identified (and perhaps encoded again) before the user got to it. This approach could be even more refined if the user were surfing from song to song via a method that landed him or her in the middle of the song as opposed to the beginning. In this case, Song ID and splitting would only be done on demand—with demand being indicated if the user listened to a certain minimum length of the song or indicated a preference to go back to the beginning to the song.

The system may impose the restriction that one or more standard stations be a talk station in order to conserve processing power.

No series of short cuts will ensure that just the right amount of processing power is always available. As such, the system may employ an algorithm for deciding the functions that do not get performed if there is not enough horsepower. When memory is in surplus, some encoding can be postponed and when that is not the case, then splitting and Song ID could be postponed. Other measures could be to stop buffering one or more channels, starting with the roving station and then those standard stations that are listened to least.

TV Tuner and other Broadcast Means

A tuner/encoder may be adapted to buffer only the audio portions of broadcast TV signals. This would provide significantly more audio content for information-seeking listeners. Metadata supplied by a server could be employed to parse the captured audio stream to bookmark and describe specific information for the listener.

The metadata for the TV audio, as well as, any metadata for radio stations could be embedded in a TV broadcast signal. The data could alternatively be merged into the audio stream with an IP-over—audio technology. An alternative broadcast means to distribute metadata could be to use a paging network and build a pager into each Radio.

Business Models

The reception system that has been described can form the basis for some unique business models, particularly when combined with permission-based systems for using various features of the system. The following music-oriented features could be controlled by various "permissions":

a. Recording a song
 b. Not recording a song or other specific piece of content on a selective basis because of a characteristic of that segment.
 c. Splitting the song out with bookmarks
 d. Saving the song (for a certain length of time)
 e. Playing the song a certain number of times
 f. Skipping all or part of an ad, or skipping a song
 g. Transferring the song from the system via removable storage like flash memory or via a wireless connection. (This uploading could be done at different quality levels depending on permissions.)

The permissions that could control access to these features include the following: whether there is a watermark on the song indicating a particular copyright status; whether the song is flagged as having a certain copyright status in the Song ID database; or whether the user already owns the song in another medium (e.g. a previously purchased CD); whether the user subscribes to a particular on-line service that would normally provide access to that song; or whether the user subscribes to a "broadcast subscription service" that would give the listener certain rights to songs broadcast over the air.

The use of an MP-3 CD or other removable media, a Palm Pilot linked to the unit's USB port, or a wireless connection opens up the opportunity to interject not just metadata into the system, but advertising as well. The CD could be used to transport personalized or generic ads to users in conjunction with their downloading of metadata. These ads could substitute or supplement any subscription payments made in conjunction with the receiving of metadata. The ads could be inserted into content (typically "white space" that we create that is between copyrighted works) in the following ways: at the beginning and end of the audio track or at other major bookmarks; when the listener switched channels; when the user switched modes (from radio to CD, etc.); or between songs, either in the jukebox or the audio track.

An alternative business model, one that might protect the interests of the broadcasters, would mandate that a certain percent or absolute number of ads be listened to in order to use the unit, record songs, or play them back repeatedly.

The use of an MP-3 CD-R or other removable and write-able media or a wireless connection also opens up the opportunity convey information back to the host computer, typically a PC but perhaps a server if a cellular wireless connection is used. This back channel could be used for the following purposes:

(1) For e-commerce as listeners could indicate the singles or CD, concert tickets, or other items that they were interested in purchasing as a result of hearing them on the system.
 (2) Listeners could request specific downloaded information; such as samples off a CD they may be considering purchasing.
 (3) The listener could subscribe to a service allowing the removal off the system and/or retransmission of captured songs.
 (4) Depending on the copyright rules of the country in which the system is used, it might be a useful business model to have listeners pay a subscription fee to be able to record songs, or only certain songs, using the system. This permission might be granted only for a certain number of songs, or songs that might only be played a certain number of times, or that might only persist in memory for a certain period of time.
 (5) Information regarding listening activities, habits and patterns could be uploaded for use in monitoring the audience in an anonymous or aggregate fashion. This could generate information that could be sold back to the content providers, radio broadcasters, or record companies, or used by us to improve the service. Information specific to the listener that is conveyed to the host could be used for:
   i. Presenting better personalized ads
   ii. Charging the correct fees for any subscription services
   iii. Making guesses regarding what shows or stations a person might be interested in and using that to do automatic recordings that the user does not have to set up
   iv. To be used in collaborative filtering techniques that will allow one listener to benefit by knowing what content other similar users listened to. This could include the use of Hot Spots as described in the above-noted patent applications.
   v. Explicit quality assessments by listeners could be uploaded (user rated songs and commentaries)
   vi. Polls by the central server asking whether listeners agreed with a certain perspective on a talk show.

An alternative to uploading this information to the server, would involve storing the information on the client where it would be used for the same purpose. For instance, with some limited means to download data, a multiplicity of ads could be delivered to the client, for instance via CD. The client could then choose those that best fit the user's profile based on listening data collected but stored on the client. This approach would work well with automatic recording as well. (Other functions mentioned above do require uploaded information, such as proper billing.)

Note that all of these applications could apply to both music or talk content.

Conclusion

The methods and apparatus which have been described are merely illustrative applications of the principles of the invention. Numerous modifications may be made to the systems and components which have been described without departing from the true spirit and scope of the invention. For example, many of the techniques used for selecting, recording and reproducing radio signals can be used to advantage in television systems.

What is claimed is:

1. A radio reception and playback unit comprising, in combination,
    a digital memory for storing broadcast program signals,
    n tuners for simultaneously receiving n different broadcast program signals, where n is greater than one, each of said tuners having a digital output for continuously supplying a selected one of said broadcast program signals in digital form to said digital memory,
    a playback device for reproducing a selected recorded program signal stored in said digital memory in an audible form perceptible to a listener, and
    a user interface including n pushbuttons each associated with a corresponding one of said n tuners and each of which, when pressed, controls said playback device to reproduce a recorded broadcast program signal previously received by the corresponding one of said n tuners.

2. A radio reception and playback unit as set forth in claim 1 wherein said user interface further includes a skip control activated by said listener coupled to said playback device for reproducing content recorded at a different time from the tuner currently selected by the depressed one of the n pushbuttons.

3. A radio reception and playback unit as set forth in claim 1 further comprising means for storing bookmark data for identifying the start of different segments of said broadcast program signals recorded in said digital memory, and wherein said user interface includes a content navigation control for controlling said playback device to reproduce the segment identified by one of said bookmarks.

4. A radio reception and playback unit as set forth in claim 3 wherein said means for storing bookmark data includes means for accepting a marking signal from a listener for storing a bookmark the identifies that program segment currently being reproduced by said playback device to enable a program segment currently being reproduced to be replayed at a later time.

5. A radio reception and playback unit as set forth in claim 3 wherein said means for storing bookmark data includes signal processing means for analyzing said broadcast program signals to store bookmarks identifying locations where the content of said signals changes between music and talk.

6. A radio reception and playback unit as set forth in claim 3 wherein said means for storing bookmark data includes means for storing metadata which identifies detectable characteristics of said broadcast program signals and means for analyzing said program signals to store said bookmarks for identifying program segments containing said detectable characteristics.

7. A radio reception and playback unit as set forth in claim 6 wherein said means for storing metadata includes input means for importing said metadata from an external source.

8. A radio reception and playback unit as set forth in claim 1 wherein said user interface further includes a display for visually presenting information which identifies at least some of said broadcast program signals stored in said digital memory.

9. A radio reception and playback unit as set forth in claim 1 wherein said user interface includes means actuated by said listener for persistently saving that portion of the recorded broadcast program currently being reproduced by said playback unit.

10. A radio reception and playback unit as set forth in claim 8 further comprising
    means for storing bookmarks for identifying the start of different segments of said broadcast program signals recorded in said digital memory, and wherein said
    a user interface further includes a content navigation control for controlling said playback device to select and reproduce one of said different segments identified by one of said bookmarks.

11. A radio reception and playback unit as set forth in claim 10 wherein said means for storing bookmarks includes means for accepting a marking signal from said listener for storing a bookmark the identifies that program segment currently being reproduced by said playback unit to enable said program segment currently being reproduced to be replayed at a later time.

12. A radio reception and playback unit as set forth in claim 10 wherein said means for storing bookmarks includes signal processing means for analyzing said broadcast program signals to store bookmarks identifying locations where the content of said signals changes between music and talk.

13. A radio reception and playback unit as set forth in claim 10 wherein said means for storing bookmarks includes means for storing metadata which identifies detectable characteristics of said broadcast program signals and means for analyzing said program signal to store said bookmarks for identifying individual segments of said program signal containing said detectable characteristics.

14. A radio reception and playback unit as set forth in claim 13 wherein said means for storing metadata includes input means for importing said metadata from an external source.

15. A radio reception and playback unit as set forth in claim 10 wherein said user interface further includes a display for visually presenting information which identifies at least some of said segments of said broadcast program signals recorded in said digital memory.

16. A radio reception and playback unit as set forth in claim 10 wherein said user interface includes means actuated by said listener for persistently saving that portion of the recorded broadcast program currently being reproduced by said playback unit.

* * * * *